Patented Sept. 2, 1952

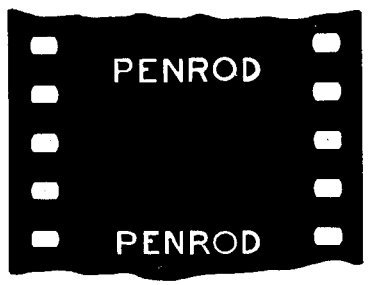
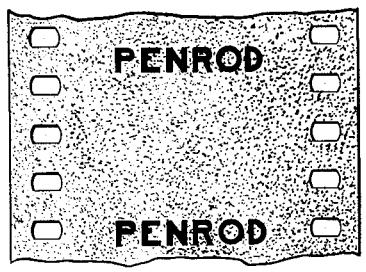
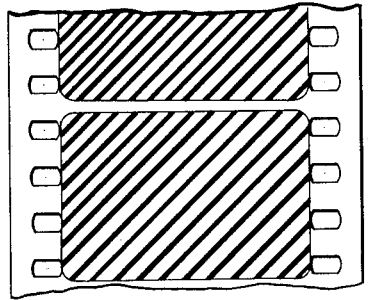
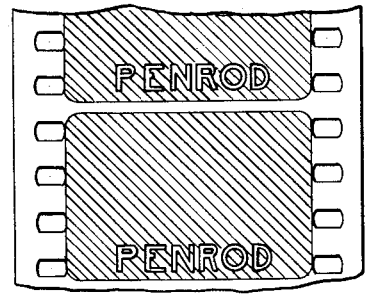
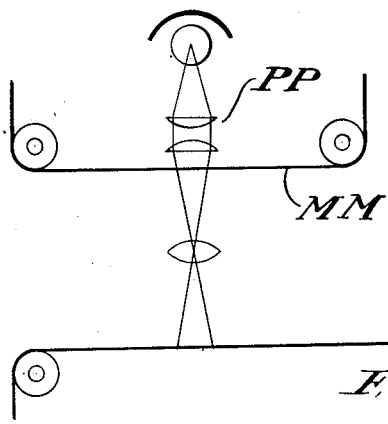
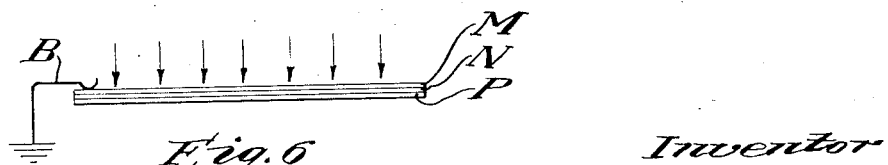

2,609,294

UNITED STATES PATENT OFFICE 2,609,294

CINEMATOGRAPHIC MATTE FILM AND PROCESS OF MAKING IT

Leland B. Prentice, Arcadia, Calif., assignor to Technicolor Motion Picture Corporation, Los Angeles, Calif., a corporation of Maine Application September 10, 1947, Serial No. 773,148

3 Claims. (Cl. 95—5)

In the art of cinematography it is often desirable to obstruct the passage of light through certain portions of the picture areas of the film. For example in printing pictures with titles in different languages for use in different countries it is customary to print the titles concomitantly with the pictures with matte films having opaque lettering. In printing positives from negatives the mattes are superposed so that the lettering is transparent on the positives and the pictures are printed only throughout the picture areas surrounding the lettering. However this practice has not been satisfactory for the reason that the matte films collect dust and lint and are very difficult to clean.

Objects of the present invention are to overcome the aforesaid difficulty and to produce matte films which have little tendency to collect dust and lint.

The present invention involves the discovery that the aforesaid difficulty is due to static electricity developed in the clear portion of the matte films, which contain no silver particles, and that it is possible to prevent the accumulation of the electricity, by thinly distributing conducting particles throughout the clear areas, without substantially affecting the quality of the pictures printed through these areas.

For the purpose of illustration a typical embodiment of the invention is shown in the accompanying drawings in which Fig. 1 shows a master matte from which the aforesaid matte is made;

Fig. 2 is a similar view of the matte printed from the master matte;

Fig. 3 is a similar view of a picture negative;

Fig. 4 is a similar view of a positive printed from the picture negative through the aforesaid matte;

Fig. 5 is a diagram showing how the matte is made; and

Fig. 6 is a sectional view indicating how the positive is printed from the negative through the matte.

In the particular embodiment chosen for the purpose of illustration the master matte MM comprises a film which is opaque except for the lettering in each picture space. From this master matte a matte M is printed, the matte being relatively opaque throughout the letters and being substantially transparent elsewhere. However instead of being entirely devoid of silver particles throughout the transparent area, as has been the practice heretofore, the matte M has silver particles thinly distributed throughout the relatively transparent areas. A suitable way of making the matte M from the master matte MM is illustrated in Fig. 2 where PP indicates a projection printer for printing the matte M from the master matte MM and F indicates a flasher for giving the matte film M a light overall exposure in addition to the image exposure at PP. While the flash exposure at F may be considerable without interfering with the printing of pictures through the matte it has been found that the most satisfactory flash exposure for most purposes is such that the silver density throughout the relatively transparent areas after development will be approximately 0.12.

After the matte M has been produced it is superposed with the negative N to print the positive P. In contact printing the matte may be interposed between the negative and positive but preferably the negative and positive are fed through the printer face to face with the matte superposed over the negative as indicated in Fig. 6. Not only does this result in sharper images on the positive but it permits the coated side of the matte M to contact with a brush B through which electricity may be conducted to ground continuously so as not to accumulate on the matte film while in use. Likewise in projection printing the matte may contact either side of the negative.

It should be understood that the present disclosure is for the purpose of illustration only and that this invention includes all modifications and equivalents which fall within the scope of the appended claims.

I claim:

1. In the art of cinematography, matte motion picture film which comprises a photographic layer containing transparent areas with opaque silver lettering in parts thereof, the transparent areas containing developed silver particles, the particles being distributed uniformly throughout the transparent areas and located predominantly at the surface of the layer, the density of the silver in the areas being at least approximately 0.12 but the areas being substantially transparent, whereby in running the film through machines the static electricity may be conducted away from said transparent areas by said uniform distribution of silver without interfering with the transmission of pictures therethrough.

2. In the art of cinematography, matte motion picture film which comprises a photographic layer containing transparent areas with opaque silver lettering in parts thereof, said layer being insensitive to light and containing developed silver particles in the transparent areas, the particles being distributed uniformly throughout the transparent areas but located predominantly at the surface of the layer, the density of the silver in the areas being at least approximately 0.12 but the areas being substantially transparent, whereby in running the film through the machines the static electricity may be conducted away from said transparent areas by said uniform distribution of silver without interfering with the transmission of pictures therethrough.

3. In the art of cinematography, the method of printing photographic silver halide emulsion of motion picture film which comprises exposing areas of the emulsion with normal exposure light of such character as to produce transparent areas with opaque lettering in parts thereof, uniformly exposing all said areas from the emulsion side of the film in such manner as to expose predominantly the grains at the surface of the emulsion, and developing all said areas, the uniform exposure being sufficient to produce a uniform density of silver of at least approximately 0.12, whereby in running the film through machines the static electricity may be conducted away from said other areas by said uniform density of silver without interfering with the transmission of pictures therethrough.

LELAND B. PRENTICE.

REFERENCES CITED

The following references are of record in the file of this patent:

UNITED STATES PATENTS

| Number | Name | Date |
|---|---|---|
| 1,791,053 | Cooley | Feb. 3, 1931 |
| 2,219,987 | Gaspar | Oct. 29, 1940 |
| 2,219,988 | Gaspar | Oct. 29, 1940 |

FOREIGN PATENTS

| Number | Country | Date |
|---|---|---|
| 309,659 | Great Britain | Apr. 18, 1929 |
| 446,172 | Great Britain | Apr. 14, 1936 |

OTHER REFERENCES

Nietz: "Theory of Development," published by Eastman Kodak Co., Rochester, N. Y., 1922; pages 139–140.

Clerc: "Photography—Theory and Practice," published 1937 by Pitman Publishing Co., New York, page 229.